United States Patent [19]

Pierce et al.

[11] Patent Number: 5,666,364

[45] Date of Patent: Sep. 9, 1997

[54] METHOD FOR PRIORITIZING SERVICES PROVIDED BY DIFFERENT NETWORK ENTITIES

[75] Inventors: Jennifer A. Pierce, Algonquin; Kamala D. Urs, Bartlett, both of Ill.

[73] Assignee: Motorola, Inc., Schaumburg, Ill.

[21] Appl. No.: 609,672

[22] Filed: Mar. 1, 1996

[51] Int. Cl.$^6$ .............. H04M 3/20; H04Q 7/38
[52] U.S. Cl. .............. 370/455; 370/496; 379/208; 379/219; 455/466; 455/512; 455/518; 340/825.51
[58] Field of Search ............. 370/58.1, 58.2, 370/68.1, 85.13, 85.6, 110.1, 360, 375, 377, 378, 496, 522, 437, 444, 455; 379/208, 215, 218, 219, 220, 93, 94, 100, 98; 455/54.1, 54.2, 58.1; 340/825.5, 825.51, 825.44

[56] References Cited

U.S. PATENT DOCUMENTS

| | | | |
|---|---|---|---|
| 4,277,649 | 7/1981 | Sheinbein | 379/201 |
| 4,757,529 | 7/1988 | Glapa et al. | 379/244 |
| 4,852,151 | 7/1989 | Dittakavi et al. | 379/97 |
| 4,995,074 | 2/1991 | Goldman et al. | 379/97 |
| 5,146,489 | 9/1992 | Telibasa | 379/100 |
| 5,271,058 | 12/1993 | Andrews et al. | 379/210 |
| 5,504,939 | 4/1996 | Mayrand et al. | 455/34.1 |
| 5,513,251 | 4/1996 | Rochkind et al. | 379/93 |

*Primary Examiner*—Hassan Kizou
*Assistant Examiner*—Kwang Bin Yao
*Attorney, Agent, or Firm*—George C. Pappas

[57] ABSTRACT

An apparatus and associated method employ the concept of a central busy list for coordinating the receipt of incoming calls to a subscriber subscribing to the calling services of separate first and second communication networks. The central busy list apparatus cooperates with the networks to register a current call by a subscriber serviced by the first network, to receive a request for interruption of the call serviced by the first network to allow the subscriber to receive an incoming call to be serviced by the second network, to send a request to disconnect to the first network when a priority of the current call is lower than the priority of the incoming call, and to deny interruption of the current call by the incoming call when the priority of the current call is higher.

16 Claims, 3 Drawing Sheets

METHOD FOR PRIORITIZING SERVICES PROVIDED BY DIFFERENT NETWORK ENTITIES

FIELD OF THE INVENTION

The present invention relates to coordination of services by multiple network entities, and more particularly, by overlaid, communication system networks.

BACKGROUND OF THE INVENTION

In a given metropolitan area, a particular communication user may have theoretical access to a plurality of RF communication systems. The basic operation and structure of commonly available communication systems, such as dispatch communications systems and cellular communications systems are known.

Dispatch communication systems typically comprise a dispatch application processor (DAP), a limited number of repeaters that transceive information via communication channels, and a plurality of mobile subscriber (MS) units which may be mobile vehicle radios and/or portable radios. Of the communications channels, one is typically chosen to be a control channel. The control channel typically transceives operational information between the DAP and the MS units, such that, for example, the MS units can access the communications channels. Dispatch systems efficiently support group dispatch (group calls) which allows multiple MS units to simultaneously access one communication channel. Private or individual telephone calls are also possible.

Cellular communication systems typically comprise a mobile telephone switching office, also known as a message switching center (MSC), a plurality of cells, a limited number of communication channels, and a plurality of MS units which may be cellular telephones. Each of the plurality of cells comprises some of the limited number of communication channels, wherein one of the communications channels is designated as the control channel for that cell. The control channel transceives operational information between the plurality of communication units within the cell and the MSC such that communication units can place telephone calls via a phone system such as the Public Switched Telephone Network (PSTN).

As a result of recent advances in technology, users or subscribers can now use one communication unit to transceive in either system and to further receive or transceive messages from yet other network entities. In a geographic region, for example, that contains both a dispatch communications system and a cellular communications system, wherein the two network entities have substantially overlapping coverage areas and are operably coupled to one another, a user can operate in either system. Note is made that such network entities may, but need not, share the same RF resources, i.e., share a base transceiver link.

Presently, interworking communication systems, i.e., communication systems that are in fact overlays of multiple systems, give subscribers (within specific geographic regions) access to a variety of services, including interconnect call and circuit data call services processed by the MSC, private call and group call services processed by the DAP, and short message services (paging) processed by a network entity known as a short message service switching center (SMS-SC), the latter which may be coupled directly to the MSC. In the future, it is envisioned that other communication network entities, capable of providing, for example, packet data communications, (via RF links to remote MS units, such as computers and the like) could also be interconnected.

Unfortunately, most of the services presently offered by each network entity do not interwork from a mobile termination viewpoint. Whichever service receives a channel to the MS unit first is the service that the subscriber gets. Consequently, if some other service type attempts to connect to the active MS unit it will not be able to. For example, when a subscriber is currently involved in an interconnect call, a call from the dispatch system (group call or private call) will not be able to connect, interrupt or alert the subscriber of the incoming call. This problem is known in the industry as the 'bifurcation problem'. Many subscribers would like the option of choosing whether to continue in the current service (e.g., an MSC-processed call), or to end or to put on hold the current call to connect to the incoming call from a different service (e.g., a DAP-processed call), but are currently unable to do so.

At present, both the DAP and the MSC maintain what is known as a busy list. The busy list concept allows a subscriber to assign priority levels and/or incoming-call options with regard to the particular call types serviced by an associated network entity. However, there does not exist a means which allows a subscriber to define which of plural services is to have priority over a current call, when the service of the current call is different from that of the incoming call and provided by a different network entity.

SUMMARY OF THE INVENTION

This need and others are substantially met by an apparatus and an associated methodology which employ the concept of a central busy list (CBL). For this purpose, a separate logical network entity is provided which allows the subscriber to define either statically or dynamically which services take priority over others.

This is attained by providing in a multi-network communication system, including at least a first and second communication networks, the first network servicing subscribers with a first set of call types and the second network servicing subscribers with a second set of call types, an apparatus and associated method for coordinating the receipt of incoming calls to a subscriber subscribing to the calling services of the first and second networks. The apparatus performed method steps include:

registering a current call by a subscriber serviced by the first network;

receiving a request, from the second network, for interruption of the call serviced by the first network to allow the subscriber to receive an incoming call to be serviced by the second network;

sending a request to disconnect to the first network when a priority of the current call is lower than the priority of the incoming call; and denying interruption of the current call by the incoming call when the priority of the current call is higher.

BRIEF DESCRIPTION OF THE DRAWINGS

FIG. 2 is a state diagram describing the operational flow of information between a statically defined CBL network entity and the MSC (or DAP) when a call type is first initiated and a subsequent call of different call type and higher priority comes in;

FIG. 5 is a state diagram describing the operational flow of information between a dynamically defined CBL network entity and the MSC (or DAP) when a call type is first initiated and a subsequent call of different call type and undefined priority comes in.

DETAILED DESCRIPTION OF THE PREFERRED EMBODIMENTS

Figure 1:
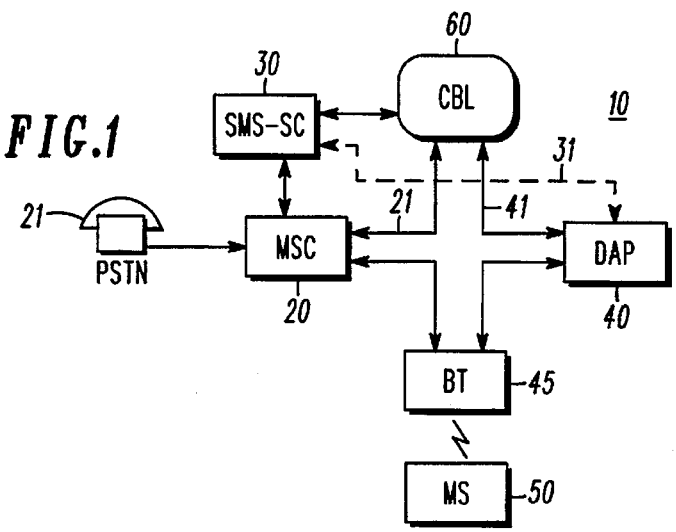
FIG. 1 illustrates a block diagram of a multi-network communication system including a central busy list network entity operably coupled in accordance with the present invention.

Referring now to the drawings and initially to FIG. 1, there is shown a multi-network communications system 10 including a message switching center network entity (MSC) 20 for servicing interconnect and circuit calls and connected by a wired transmission path to a PSTN 21 and to a short message service network entity (SMS-SC) 30. A dispatch application processor network entity (DAP) 40 for servicing dispatch calls, including group calls and private calls, is connected directly to the MSC 20 to allow subscribers in a given coverage area (defined by one or more base transceiver systems (BT) 45), to transmit and receive different types of calls to and from their mobile (or portable) subscriber MS units 50. In the preferred embodiment, a central busy list network entity (CBL) 60 is connected to both the MSC 20 and the DAP 40, via lines 21 and 41, respectively, for communication therewith.

The CBL 60 is essentially a microprocessor-embedded controller system comprising a database, the contents of which are updated dynamically to coordinate and prioritize calls serviced by the MSC 20, the SMS-SC 30 and the DAP 40. Network Entities 20, 30, 40 communicate with CBL 60, in the manner described below in connection with FIGS. 2–5, to determine if and how a call serviced by it can progress to a subscriber, who may or may not be currently involved in a call serviced by a different entity. Toward this end, CBL 60 may be a separate computing entity coupled external to either the MSC 20 or the DAP 40, or may be formed integrally with either the MSC 20 or the DAP 40 or with another network entity operably coupled to the communications system 10.

Figure 2:
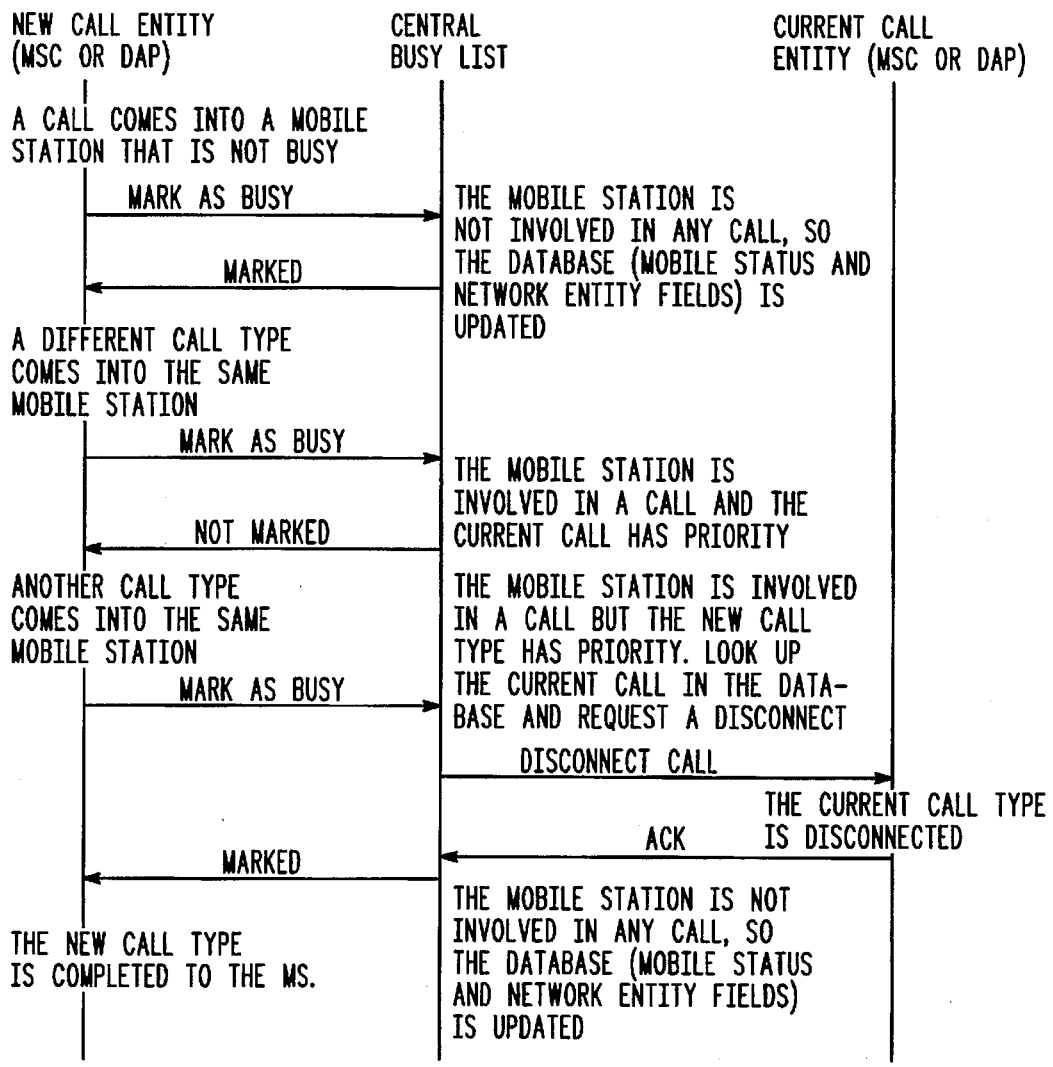

FIG. 2 describes the protocol, i.e., the datalink between the CBL 60 and the MSC 20 (or DAP 40) in accordance with a first preferred embodiment characterized by a statically-defined set of rules. The statically defined CBL concept provides that a subscriber has a pre-defined notion of which call types take priority over others. For example, the subscriber may want interconnect voice calls (serviced by the MSC 20) to always have priority over dispatch group calls (serviced by the DAP 40). Thus, whenever a subscriber is involved in a group call, the CBL will automatically end the group call and allow the interconnect call to reach the subscriber instead.

In the illustrative embodiment, the provisioned data in the CBL 60 database would include a number of pre-defined fields including a subscriber identification (SI) field and a service priority list (SPL) field for each subscriber. The SPL field defines a priority order (e.g., interconnect voice has first priority, then group calls, followed by private calls, etc.) for servicing incoming calls, whereby (a) a current call may be automatically terminated for a call of higher priority to reach the subscriber, (b) a subscriber involved in a current call may be automatically prompted of the fact that a call of higher priority is incoming so that she may terminate the current call, and/or (c) the current call may be queued for connection by the subscriber upon termination of the current call.

In addition, the CBL 60 database would maintain a number of dynamically defined data fields including a mobile status (MF) field, identifying the call type a particular subscriber is currently involved in (e.g., in_interconnect_voice_call, in_group_call, etc.), and a network entity address (NEA) field identifying the network entity (e.g., MSC 20 or DAP 40) associated with that current call. The MF and NEA fields are updated dynamically each time a call is terminated or interrupted by another incoming call. For example, when an incoming call having higher priority causes termination or interrupts a current call, the MF and NEA fields are updated with the call type and network entity address of the incoming call (i.e., the new or incoming call registers with the CBL 60).

The datalink protocol for statically defined CBL 60 processing will now be described with reference to FIGS. 2 and 3. First, when a call is made to a subscriber's MS unit 50, the CBL 60 confirms that the MS unit is not busy and registers the called subscriber (i.e., the MS unit 50) and updates the CBL 60 database (MF field associated with the MS unit is marked busy and the NEA field is updated to identify the network entity).

When a different call type is attempted to the same MS unit, the CBL 60 looks in its database and in the event the incoming call is of lower priority (as specified in the statically defined SPL field for that MS unit) it informs the calling subscriber that the called party is busy on another call.

Conversely, when the incoming call is of lower priority, in the illustrative embodiment, the CBL 60 requests a disconnect from the network entity (e.g., MSC 20 or DAP 40) servicing the current call. Once termination of the current call is acknowledged by the requested network entity, the CBL 60 updates its database to mark the MS unit 50 as busy handling the incoming call, with the appropriate fields updated to allow a subsequent different call type with yet higher priority to be able to receive access to the subscriber.

Figure 3:
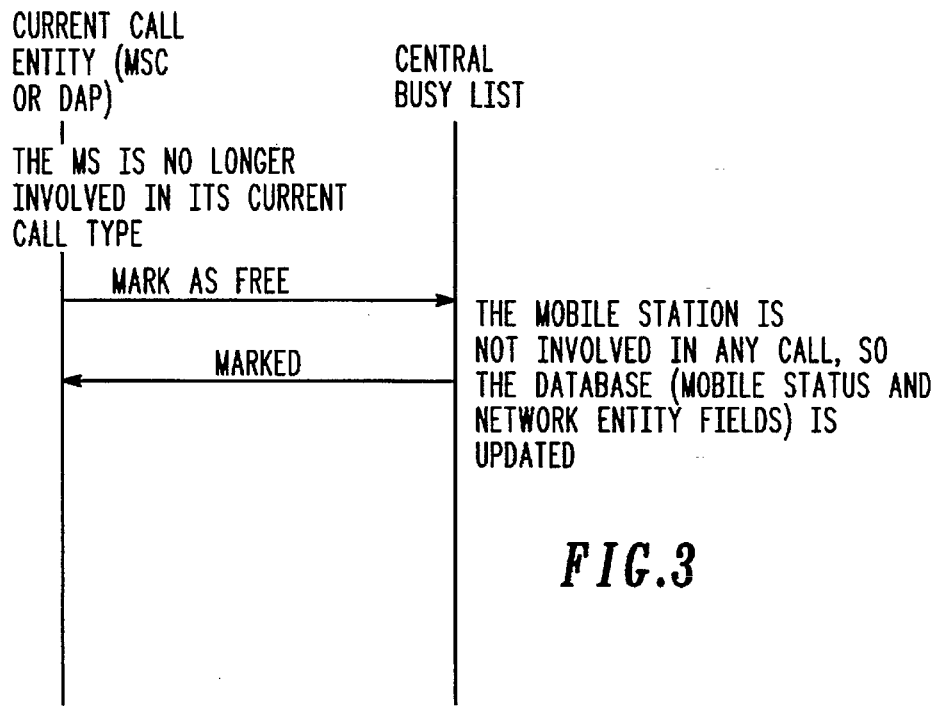
FIG. 3 is a state diagram describing the operational flow of information between the CBL network entity and the MSC (or DAP) when a call type completes.
Figure 4:
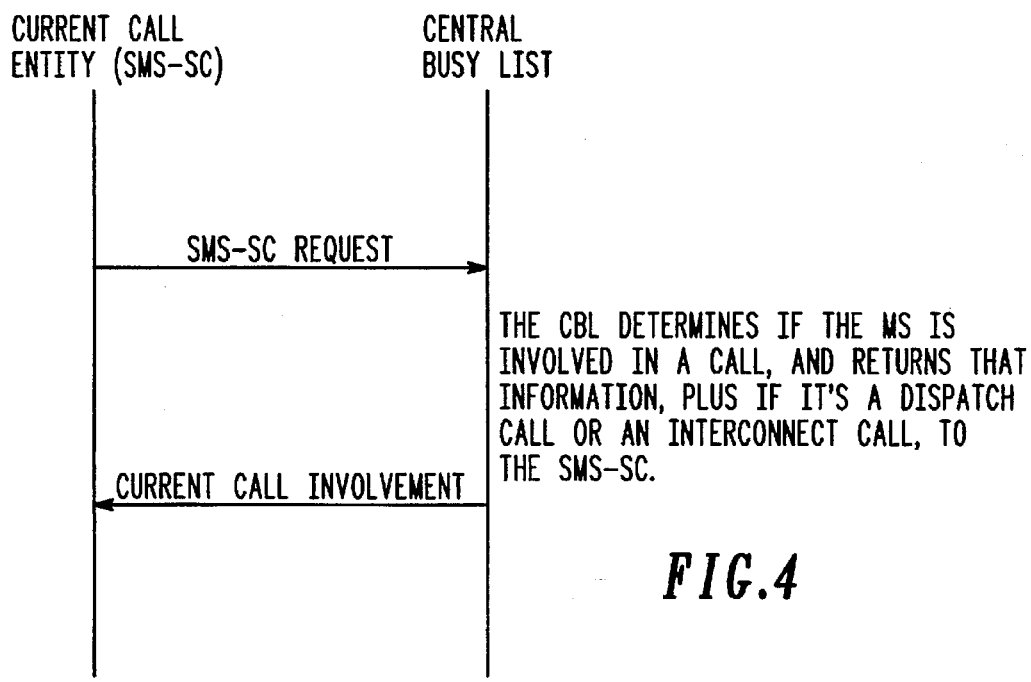
FIG. 4 is a state diagram describing the operational flow of information between the CBL network entity and the SMS-SC during short message service.

Finally, when a current call is terminated before a subsequent incoming call is received (or when no incoming call is queued), the network entity servicing the terminated call informs the CBL 60 which then updates its database to clear the appropriate fields (see FIG. 3).

The exception to the above processing steps occurs with regard to short messages (pages) received from the SMS-SC 30. Short messages are typically delivered during an interconnect call, not during a dispatch call, because the SMS-SC network entity 30 must be operably coupled to either the MSC 20 or the DAP 40, and because connecting the SMS-SC 30 to the MSC 20 until now has been most practical. However, because the DAP 40 has the ability to deliver (with some modification) short messages, it is envisioned that the SMS-SC may also be connected to the DAP 40 (shown by a dotted line 31 in FIG. 1) by a scheme whereby a short message to a subscriber involved in a group call selectively interrupts the dispatch service to (only) that subscriber. This may be performed by a temporary channel reassignment (see section B below).

Thus, for short messaging, the only purpose of the CBL 60 is to inform the SMS-SC 30 when the subscriber is involved in some dispatch service. If so, then the SMS-SC 30 will instruct the DAP 40 to deliver the short message (see FIG. 4).

Figure 5:
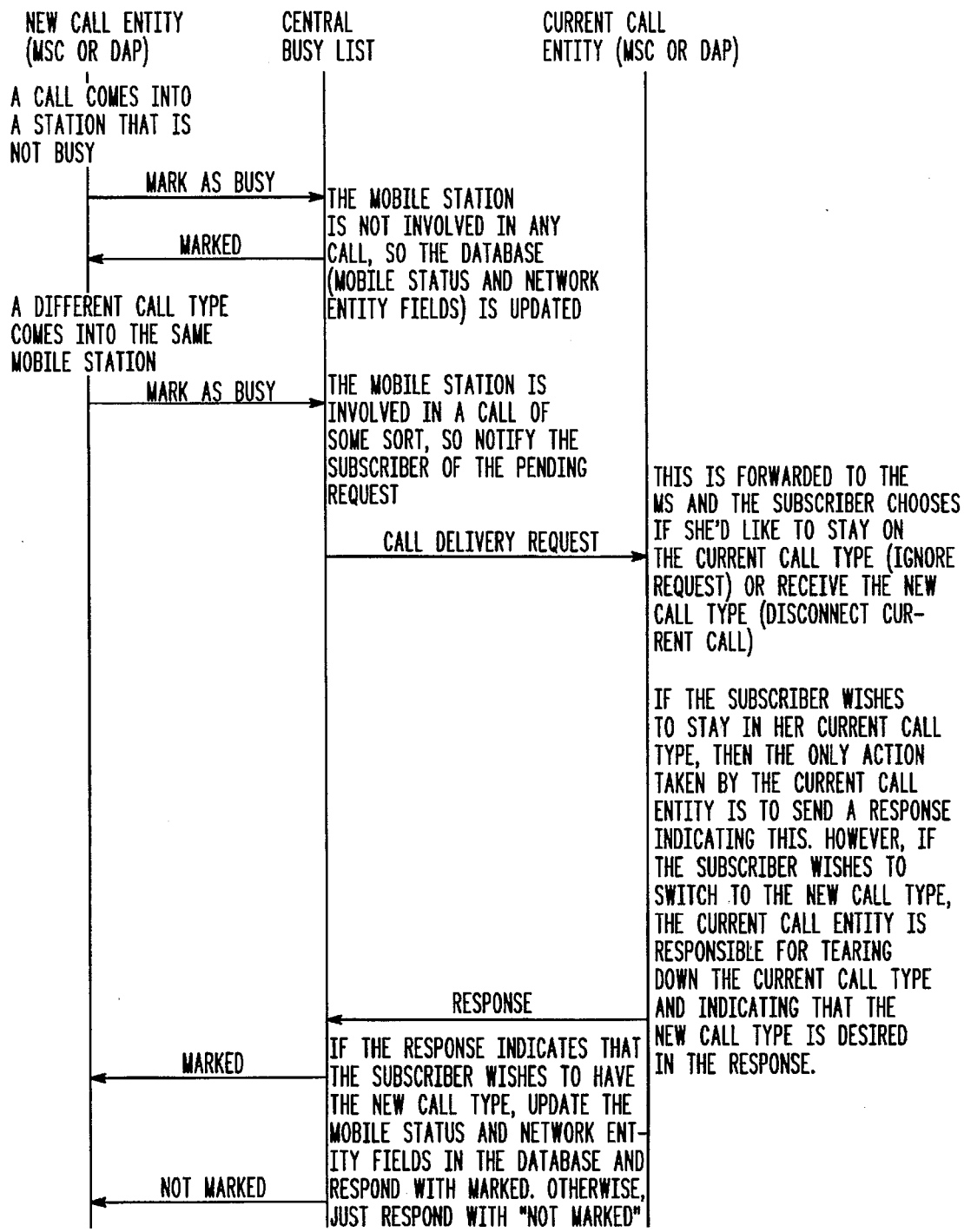

Referring now to FIG. 5, there is illustrated an alternative embodiment whereby a subscriber can decide 'on the fly' which call type takes priority over another call type. For example, if the subscriber is currently involved in a group call and an interconnect call is attempting to reach her, she will be notified of the interconnect call and indicate that she wants to receive it. Indication is given by disconnecting the current call or by ignoring the status message. If she disconnects the current call, the DAP 40 will remove her from the group call and turn over servicing of the interconnect call to the MSC 20. If she ignores the request, the incoming call will not get through to her.

The procedure for notifying the subscriber via the MS unit 50 could look as follows:

Call_Delivery_Request(call_type,originating_party,priority)

where call_type is the type of call attempting to get through to the subscriber (group call, interconnect call, short message, etc.), originating_party is who is attempting the call_type, and priority is the urgency of the call.

From a database perspective, in the instance of dynamically defined CBL processing, the provisioned data in the CBL 60 database would consist of an SI field, an MS field and an NEA field. Short message processing during dispatch can be handled in the same way as in the preferred embodiment regarding statically defined priority assignments.

Implementation of the CBL methodology necessarily involves (a) dealing with the problem of identifying all the subscribers in a group call and (b) with regard to dynamically defining priority, notifying an MS unit of a pending call type.

A. Identifying the Current Active Group Call Users.

Both static and dynamic priority assignment schemes described above require that the CBL know which users are currently involved in some type of transaction. For a group call in certain cases, knowing all the members currently involved in a group call is virtually impossible. The reason is that the DAP 40 only cares about a page response from one MS unit 50 in a group located in a certain location area and it ignores any other page responses. Also, even if an MS unit 50 does not respond to the page, it could still be involved in the group call.

As a result, a list of members currently involved in a group call could be derived. The DAP 40 has stored in its databases which MS units are turned on, where each one is located, and what group calls are currently active. When a group call is initiated, the DAP 40 could derive which members are involved in the call and notify the CBL 60 of the potential members. Once the group call has completed, the DAP 40 could tell the CBL of this call completion. This means that the "mark as busy" and "mark as free" procedures (see FIGS. 2 and 5) would be implemented for every group member.

B. Notifying a Current Call User of a Pending Call type.

A subscriber may be asked, during dynamic priority assignment, to choose a call type during a dispatch group call. During a group call, there is no channel dedicated to each subscriber. Instead, all the subscribers are assigned to one channel. As a result, there is currently no mechanism in place to ask a specific subscriber what service she would like to have, without notifying the other MS units involved in the group call as well.

Two schemes are proposed for dealing with this dilemma.

DISPATCH: Currently, channels are used for dispatch as follows:

1. An originating MS initiates a group call procedure on a dedicated control channel.
2. The DAP and BT assign a channel in every necessary cell as TCH (traffic channel) and ACCH (associated control channel).
3. The MS units listen to the downlink TCH and do not transmit.
4. The originating MS uses the ACCH to send an EOT (end of transmission) and the uplink TCH for talking/transmitting.
5. The DAP uses the ACCH to send some things—not much.
6. When the originating MS sends EOT, the TCH/ACCH is reconfigured as TCCH (temporary control channel), now any MS can signal his desire to talk using the TCCH.
7. The TCCH is reconfigured as a TCH and ACCH to accommodate a new talker.

In order to notify the group call listener/talker about a pending call, signaling to a SPECIFIC MS during TCH transmission or while call is idle and the TCCH is set up must occur.

In accordance with a first scheme, the use of TCCH by the DAP for sending something to a specific MS unit must be defined. The DAP 40 will need to assign a channel as being used for 'point-to-point dispatch signaling'. All MS units will need to check which MS should listen to that channel. After this procedure is done, the DAP will reassign the channel so that the MS units can ask for the channel in order to transmit voice.

A second proposed scheme is as follows. The use of the ACCH by the DAP 40 for sending something to a specific MS unit must be defined. The DAP 40 will need to temporarily assign the ACCH as being used for 'point-to-point dispatch signaling'. This would restrict the MS unit currently transmitting voice from giving up control for a short period of time. All MS units will need to check which MS unit is being targeted. The appropriate MS should listen to that channel. After this procedure is done, the DAP will reassign the channel so that normal communications may occur.

By way of illustration, the following routine is provided.

1) DAP 40 sends Call_Delivery_Request(call_type, originating_party, priority) to MS Unit 50.
2) MS unit 50 analyzes the request.
3) If call_type==SMS_DAP-DELIVERY

```
        MS unit 50 responds with ack or nack
        If ack
            DAP 40 sends Dispatch_SMS
            MS unit 50 responds with ack or nack
            DAP 50 may now reply to source
else
        No response by MS unit 50 is necessary
        If MS unit 50 decides to leave for other service
            MS unit 50 terminates transmission, if necessary
            MS unit 50 leaves to go receive interconnect page.
```

4) DAP 40 is now able to reconfigure channel.

INTERCONNECT: A new message is used to send to the MS unit 50—Call_Delivery_Request. The MS unit 50 does not need to respond. The MS unit will disconnect if it wants to accept the dispatch call.

The present invention as described by the foregoing utilizes a separate logical network entity which allows a subscriber to define, either statically or dynamically, which services take priority over others, thus solving the bifurcation problem of conventional multi-network communications systems.

Network entities 20, 30 and 40 are known in the art and can be readily programmed to communicate with the CBL 60 in the manner described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a multi-network communication system including at least a first and second communication networks, said first network servicing subscribers with a first set of call types of system serviceable call types and said second network servicing subscribers with a second set of call types of the system serviceable call types, a method for coordinating the receipt of incoming calls to a subscriber subscribing to the system serviceable call types of at least said first and second networks, comprising the steps of:

registering a current call associated with the first set of call types by a subscriber serviced by the first network;

receiving a request, from the second network, for interruption of the current call serviced by the first network to allow the subscriber to receive an incoming call associated with the second set of call types to be serviced by the second network;

sending a request to disconnect service to the current call to the first network when a priority of the subscriber to maintain access to the current call is lower than a priority of the subscriber to be given access to the incoming call; and denying interruption of the current call by the incoming call when the priority to maintain access of the current call is higher than the priority to be given access to the incoming call, wherein the first and second sets of call types are different system serviceable call types, and whereby said system serviceable call types comprise at least two of the following call types:

(a) telephone interconnect calls and circuit data calls serviced by a message switching center, (b) dispach calls serviced by a dispatch application processor;

(c) packet data type call serviced by a packet data service system, and (d) paging requests serviced by short message service switching system.

2. The method of claim 1, further comprising, upon completion of the step of receiving a request from the second network, the steps of:

prompting the subscriber when an incoming call request is received, and assigning the associated priorities to the current and incoming calls on the basis of a priority election by the subscriber.

3. The method of claim 1, wherein the step or registering the current call includes the step of registering the call type of the current call serviced by the first network, and the steps of sending a request to disconnect and denying interruption include the step of comparing the call type of the incoming call and the registered call type of the current call.

4. The method of claim 1, wherein the steps of sending a request to disconnect and denying interruption are executed on the basis of a predefined service priority list associated with the subscribe.

5. The method of claim 1, wherein the step of registering is performed by a device adding a subscriber's identification information to a central busy list, when the current call is terminated, the method further comprising the steps of removing the subscriber's identification information from the central busy list.

6. The method of claim 5, wherein said central busy list includes identification information for all subscribers currently involved in a call being serviced by either of the first and second networks and a queue of incoming calls for at least one subscriber currently involved in a call.

7. The method of claim 1, wherein said first network is a dispatch system network providing a group call to multiple subscribers at one time, said step of registering the current call involves the step of registering all the current calls of the individual subscribers associated with the group call.

8. The method of claim 7, wherein when an incoming call from the second network is received for one of the subscribers among said individual subscribers involved in the group call, the method further comprising the steps of prompting only said one subscriber of the incoming call request, and assigning a priority to the current and incoming calls on the basis of a priority election by said one subscriber.

9. In a multi-network communication system including a first communication network for servicing subscribers with a first set of call types of system serviceable call types and a second communication network servicing subscribers with a second set of call types of the system serviceable call types, a monitoring apparatus for coordinating the receipt of incoming calls to a subscriber subscribing to the system serviceable call types provided by at least the first and second networks, the apparatus comprising:

means for registering a current call associated with the first set of set types by a subscriber serviced by the first network;

means for receiving a request, from the second network, for interruption of the current call serviced by the first network to allow the subscriber to receive an incoming call associated with the second set of call types to be serviced by the second network;

means for sending a request to disconnect service to the current call to the first network when a priority of the subscriber to maintain access to the current call is lower than a priority of the subscriber to be given access to the incoming call; and means for denying interruption of the current call by the incoming call when the priority to maintain access of the current call is higher than the priority to be given access to the incoming call, wherein the first and second sets of call types are different system serviceable call types, and whereby said system serviceable call types comprise at least two of the following call types:

(a) telephone interconnect calls and circuit data calls serviced by a message switching center, (b) dispatch calls serviced by a dispatch application processor;

(c) packet data type calls serviced by a packet data service system, and (d) paging requests serviced by a short message service switching system.

10. The apparatus of claim 9, further comprising:

means for prompting the subscriber when an incoming call request is received; and means for assigning the associated priorities to the current and incoming calls on the basis of a priority election by the subscriber.

11. The apparatus of claim 9, wherein the means for registering the current call includes means for registering the call type of the current call serviced by the first network, and wherein the means for sending a request to disconnect and the means for denying interruption include means for comparing call type of the the coming call and the registered call type of the current call.

12. The apparatus of claim 9, wherein the means for sending a request to disconnect and the means for denying interruption include a predefined service priority list associated with the subscriber.

13. The apparatus of claim 9, wherein the means for registering includes means for adding a subscriber's identification information to a central busy list, and further includes means for removing the subscriber's identification information from the central busy list when the current call is terminated.

14. The apparatus of claim 13, wherein said central busy list includes identification information for all subscribers currently involved in a call being serviced by either of the first and second networks and a queue of incoming calls for at least one subscriber currently involved in a call.

15. The apparatus of claim 9, wherein said first network is a dispatch system network providing a group call to multiple subscribers at one time, said means for registering the current call includes means for registering all the current calls of the individual subscribers associated with the group call.

16. The apparatus of claim 15, further comprising:

means for prompting only one subscriber involved in the group call of an associated incoming call request; and means for, in response to said prompt, allowing said one subscriber to dynamically assign a priority to the current and incoming calls on the basis of a priority election made thereby.

* * * * *

UNITED STATES PATENT AND TRADEMARK OFFICE
CERTIFICATE OF CORRECTION

PATENT NO.    : 5,666,364
DATED         : September 9, 1997
INVENTOR(S)   : Pierce et al.

It is certified that error appears in the above-indentified patent and that said Letters Patent is hereby corrected as shown below:

In Column 7, line 64 "subscribe" should be --subscriber--.

Signed and Sealed this

Sixth Day of January, 1998

Attest:

BRUCE LEHMAN

Attesting Officer          Commissioner of Patents and Trademarks